(12) United States Patent
Clayton et al.

(10) Patent No.: US 9,367,858 B2
(45) Date of Patent: Jun. 14, 2016

(54) METHOD AND APPARATUS FOR PROVIDING A PURCHASE HISTORY

(71) Applicant: SYMBOL TECHNOLOGIES, LLC, Lincolnshire, IL (US)

(72) Inventors: Richard M Clayton, Manorville, NY (US); Kenneth W Douros, South Barrington, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/253,995

(22) Filed: Apr. 16, 2014

(65) Prior Publication Data
US 2015/0302477 A1 Oct. 22, 2015

(51) Int. Cl.
*G06K 9/00* (2006.01)
*G06Q 30/02* (2012.01)

(52) U.S. Cl.
CPC ........ *G06Q 30/0257* (2013.01); *G06K 9/00288* (2013.01); *G06K 9/00986* (2013.01)

(58) Field of Classification Search
CPC .............. G06Q 30/0631; G06F 17/30247; G06F 17/30047; H04L 51/32; G06K 9/00288; G06K 9/00986

USPC .......................................... 235/383; 382/118
See application file for complete search history.

(56) References Cited

U.S. PATENT DOCUMENTS

| | | | |
|---|---|---|---|
| 2002/0016740 A1 | 2/2002 | Ogasawara | |
| 2008/0015898 A1 | 1/2008 | Mallett et al. | |
| 2008/0279481 A1* | 11/2008 | Ando | 382/306 |
| 2010/0046842 A1* | 2/2010 | Conwell | 382/218 |
| 2012/0233003 A1 | 9/2012 | Calman et al. | |
| 2012/0246007 A1 | 9/2012 | Williams et al. | |
| 2013/0103539 A1 | 4/2013 | Abraham et al. | |
| 2013/0173367 A1* | 7/2013 | Beighley, Jr. | 705/14.16 |
| 2014/0019264 A1* | 1/2014 | Wachman et al. | 705/14.72 |
| 2014/0226000 A1* | 8/2014 | Vilcovsky et al. | 348/77 |

FOREIGN PATENT DOCUMENTS

| | | |
|---|---|---|
| WO | 2009094724 A1 | 8/2009 |
| WO | 2013103912 A1 | 7/2013 |

* cited by examiner

*Primary Examiner* — Thien M Le
*Assistant Examiner* — Claude J Brown

(57) ABSTRACT

A method and apparatus for providing a purchase history of a first user to a second (differing) user is provided herein. During operation a server is provided with an image and determines an identification of a first person within the image. Items that exist within the image, and that were purchased by the first person are also determined by the server. The server then provides information on the items purchased to a second user.

15 Claims, 5 Drawing Sheets

 TREVOR SMITH WITH T MIKE SMITH

WE HAD A GREAT TIME GOLFING TODAY!
TREVOR HAD A HOLE IN ONE!!!!

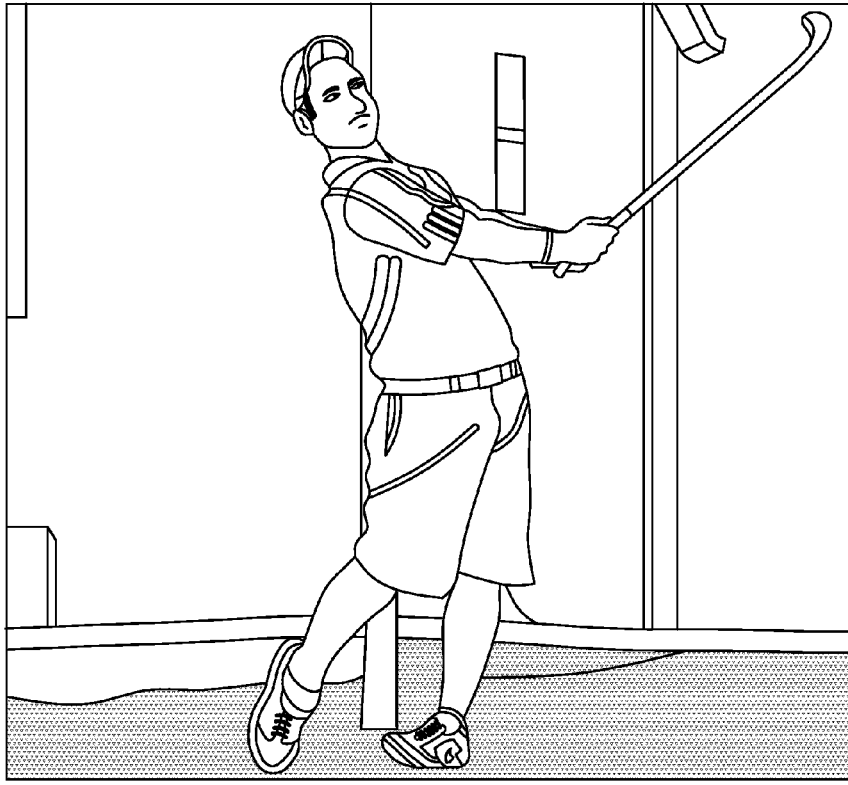 — 201

LIKE · COMMENT · SHARE · 28 MINUTES AGO ·

 JOHN SMITH LIKE THIS.

 VIEW 1 MORE COMMENT

 GIGI SMITH CONGRATULATIONS TO TREVOR!
25 MINUTES AGO · LIKE

 TIFFANY SMITH CONGRATULATIONS!!!!
23 MINUTES AGO · LIKE

 TREVOR IS WEARING BRAND X SHOES
PURCHASED FROM ACME SHOES. SALE ON ALL
SHOES TODAY!! — 202

*FIG. 3*

METHOD AND APPARATUS FOR PROVIDING A PURCHASE HISTORY

FIELD OF THE INVENTION

The present invention generally relates to providing a purchase history to a user, and more particularly to a method and apparatus for providing a purchase history of a first user to a second user.

BACKGROUND OF THE INVENTION

Consumers are constantly exposed to items worn or used by the people around them. Short of asking where a person purchased an item, the consumer may have a difficult time determining where the person purchased the item or even precisely what the item is. Because of this, it can be difficult for a retailer or manufacturer to gain the attention of people who would be interested in buying their products. Therefore, exists for a method and apparatus for providing a purchase history of a first user to a second user. It would also be beneficial to social media providers if the purchase history may be presented to the user in a way that may generate revenue for a social media provider.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 illustrates past purchase information being provided as part of a social-media posting.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus for providing a purchase history of a first user to a second (differing) user is provided herein. During operation a server is provided with an image and determines an identification of a first person within the image. Items that exist within the image, and that were purchased by the first person are also determined by the server. The server then provides information on the items purchased to a second user.

The above-described technique allows people to receive information on items shown within an image. For example, a person may identify clothing worn by an individual by taking a photograph of the individual. From the photograph, the person wearing the item of interest can be identified, and their clothing can be matched against reference images of clothes in their purchasing history (or a declared list of clothes they own). Once the clothing from the image has been found, the inquiring person can be directed to the same or similar item from the same source. If the item is ultimately purchased, the retailer is also informed of the person who facilitated the sale. This facilitating person may be compensated as an affiliate.

Figure 1:
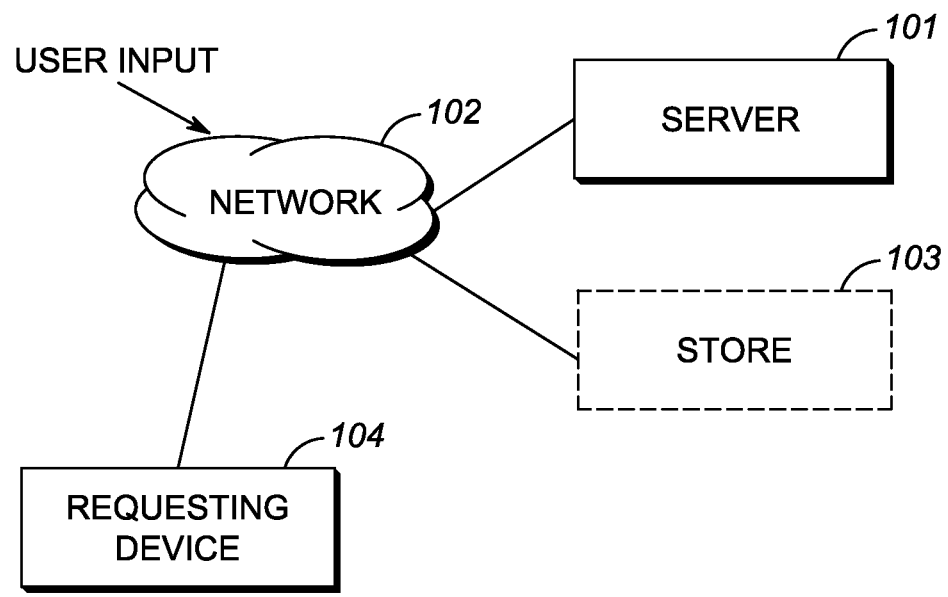
FIG. 1 illustrates a general operating environment of the present invention.

Turning now to the drawings, wherein like numerals designate like components, FIG. 1 shows a general operating environment of the present invention. As shown, requesting device 104 is communicatively coupled to server 101 through intervening network 102. Device 104 can be any portable or stationary electronic device, including but not limited to a computer, a handheld computer, a tablet computer, a mobile phone, a media player, a personal digital assistant (PDA), or the like, including a combination of two or more of these items. Requesting device 104 may have the capabilities to acquire a picture that may be sent to server 101.

Network 102 may comprise any single network, or a combination of networks. For example, network 102 may simply comprise a wired network such as those commonly provided by a multitude of internet service providers. Network 102 may also comprise a wireless network such as an LTE network. Regardless of the form that network 102 takes, network 102 facilitates communication between requesting device 104 and server 101.

Server 101 stores users' purchase histories for individuals. The purchase histories for individuals may be provided to server 101 by a user themselves as user input 105, or may be provided to server 101 via any retail establishment (e.g., store 103) at the time of purchase. For example, any individual may simply provide server 101 with product information for items that they have purchased. In order to facilitate the population of server 101 with user purchase history, a user may simply scan a stock-keeping unit (SKU) for any particular product and transmit that information to server 101, identifying the item as a past purchase.

Alternatively, store 103 may provide SKU information to server 101 at the time of an item's purchase. For example, store 103 may comprise an on-line store such as, but not limited to Amazon®, Newegg®, Overstock.com®, . . . , etc. After each on-line purchase, store 103 may inquire whether or not to update server 101 with the user purchase information. If a user accepts the request, store 103 may provide user identification information along with the purchase information to server 101.

During operation, server 101 will receive a request for purchase history from a user of requesting device 104. As discussed above, the user of requesting device may be requesting purchase history for another second individual based on the user's interest in a product associated with the second individual. Along with the request, server 101 is provided identity information of the second user. The identify information may simply comprise a user name. However, in a particular embodiment of the present invention an image is used to identify the second individual. This image may be provided by requesting device 104, or this image may have been provided in the past by the second individual.

Regardless of how server 101 is provided with the image, server 101 identifies the second individual within the image and identifies product information existing within the image that was purchased by the second individual. Product information may comprise information such as, a product manufacturer, a product name, a product price, a retail store offering the product, an internet address where information on the product is available, a SKU (or more specifically UPC/ISBN/EAN), characteristics of the item including: color, size, style, model number, brand, calories, weight, manufacturer. Information may also include such things as places to purchase the item(s) identified, prices offered at various locations, and/or a purchase link leading directly to purchase (from original retailer or from one preferred by the system), a direct purchase link.

Once server 101 has identified an individual within the image, and has identified information on items purchased by the individual (also shown within the image), requesting device 104 is provided the information on the items purchased. It should be noted that in an embodiment of the present invention only information on products shown in the image is provided to the requester. This is illustrated in FIG. 2.

Figure 2:
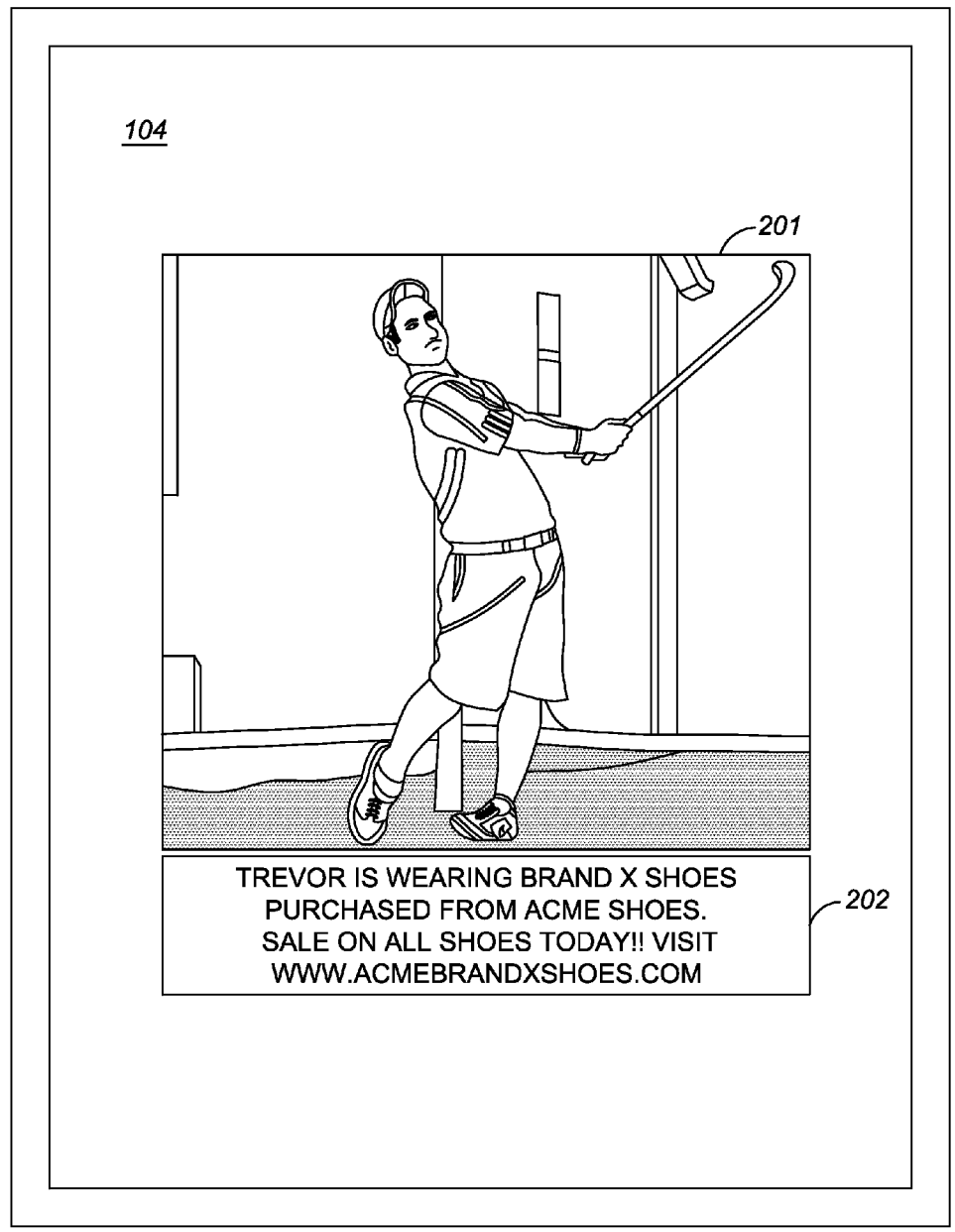
FIG. 2 illustrates past purchase information being provided to a requester.

As shown in FIG. 2, requesting device 104 displays image 201. It should be noted that image 201 may have been taken by requesting device 104, or may have been provided by a second individual (who may or may not be shown in image 201). When requesting device 104 requests information on products shown in image 201, server 101 analyzes image 201 to determine any individual shown in image 201. Server 101 also determines items purchased by the identified individual(s). Server 101 may also use image analytics to determine if any items shown in image 201 match items purchased by the identified individual(s). If image 201 contains items purchased by the identified individual(s), then server 101 determines product information 202 on such items and provides the product information to requesting device 104. As shown in FIG. 2, such information 202 may comprise a brand, a store where the item was purchased, sale information on the item, and an address where the item may be purchased.

Because a significant amount of the population uses social media, such as TWITTER® AND FACEBOOK®, to communicate with each other, social media can serve as an effective tool to provide purchase history to a user. With this in mind, server 101 may comprise a social-media server. Social media server 101 serves as a repository of information on items purchased by an individual. Server 101 also stores social media content that may include items such as images, postings, audio recordings, emails, tweets, FACEBOOK® entries, and/or any other social media content.

Further, it is assumed herein that the social media content can be stored in association with one or more attributes of the content. For example, such attributes may be:
 a source of the content—that is, an identifier of a source (for example, a person) who posted the content;
 a content location—that is, a location associated with the occurrence of an event depicted in the content (for example, any one or combination of location parameters, such as a discrete location like a jewelry store, golf course, and or a pub, a street intersection, a city, or Global Positioning Satellite (GPS) coordinates);
 a tagged individual—that is, an identity of an individual existing within an image as provided by social media users;
 an event—that is, the event associated with the content (for example, a concert, an athletic event associated with a image);
 Who tagged individuals;
 Who viewed the image;
 Tags that were removed.

This list of attributes is provided to illustrate the principles of the present invention and is not intended to be a comprehensive listing of all attributes that may be associated with social media content.

As shown in FIG. 3, information on items purchased 202 may be provided as part of a social-media posting and/or social media comments. For example, image 201 may have been uploaded to social-media server 101 and posted as part of an individual's social media postings. Social-media server 101 may then determine individuals within image 201, determine purchase history of individuals within image 201, and determine if any item detected within image 201 match a purchase history of detected individuals. Purchase history 202 may be discretely provided to any requestor, or alternatively, may be "posted" to comments associated with the image (as shown in FIG. 3).

Figure 4:
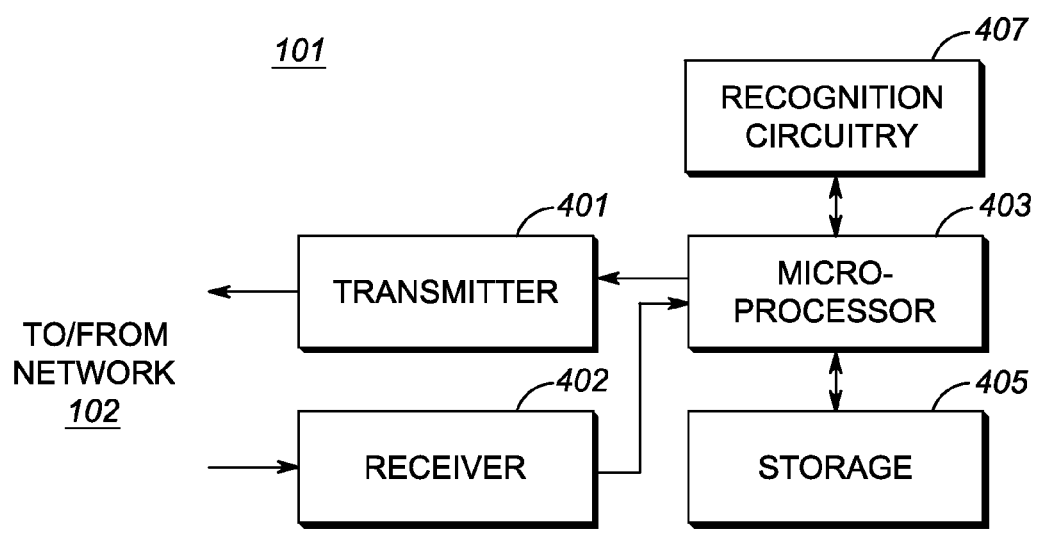
FIG. 4 is a block diagram of the server of FIG. 1.

FIG. 4 is a block diagram of the server of FIG. 1. Server 101 typically comprises processor 403 that is communicatively coupled with various system components, including transmitter 401, receiver 402, general storage component 405, recognition circuitry 407, and potentially, a user interface (GUI) (not shown). Only a limited number of system elements are shown for ease of illustration; but additional such elements may be included in the server 101.

Processing device 203 may be partially implemented in hardware and, thereby, programmed with software or firmware logic or code for performing functionality described; and/or the processing device 403 may be completely implemented in hardware, for example, as a state machine or ASIC (application specific integrated circuit). Storage 405 can include short-term and/or long-term storage of various content described above. Storage 405 may further store software or firmware for programming the processing device 403 with the logic or code needed to perform its functionality.

In a first embodiment, recognition circuitry 407 preferably comprises facial recognition circuitry that is capable of recognizing various properties of items of clothing, including but not limited to color, object type, logs, etc.

Transmitter 401 and receiver 402 are common circuitry known in the art for communication utilizing a well known communication protocol, and serve as means for transmitting and receiving messages. For example, receiver 402 and transmitter 401 may comprise a simple network interface card, or may utilize an over-the-air protocol such as the IEEE 802.11 system protocol, BLUETOOTH®, HYPERLAN®protocols, or any other communication system protocol.

During operation, receiver 402 receives a request for product information. An image may have been provided with the request, or the request may identify an image in storage 405. The request may also identify an individual within the image. If the individual within the image has not been identified, the image is provided to recognition circuitry 407. Recognition circuitry 407 identifies all individuals within the image. This information is then provided to microprocessor.

Knowing the individual within the image, microprocessor 403 accesses storage 405 to determine if any purchase history is stored for the identified individual. The image and the purchase history are then provided to recognition circuitry 407 to determine if any purchased items are within the image via complete item recognition or a best guess match on correlated object metadata. Recognition circuitry 407 then provides processor 403 a list of all identified items. In response, processor 403 provides this information to the requester. This information may simply be transmitted to the requester via transmitter 401, or may be stored in storage 405 as part of social media content.

Figure 5:
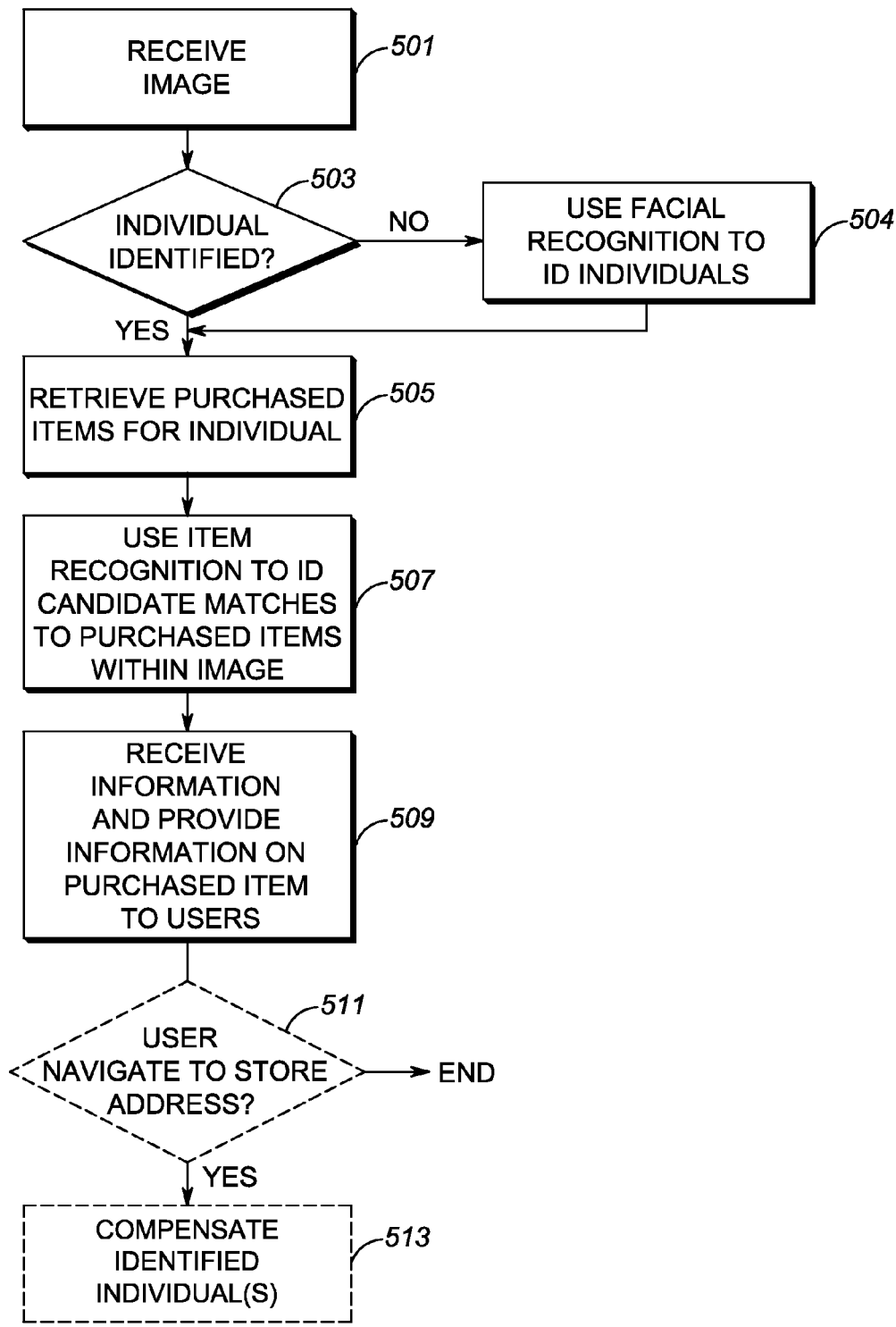
FIG. 5 is a flow chart showing operation of the server of FIG. 1

FIG. 5 is a flow chart showing operation of the server of FIG. 4. The logic flow begins at step 501 where logic circuitry 403 receives an image of at least a first individual. As discussed above, this image may be retrieved from storage 405 or received as part of a request for information on the image. Regardless of how the image is received, at step 503, logic circuitry 403 determines if individuals have been identified in the image. For example, the requester (second individual) may provide identification information to the server. If not, in step 504, the image is provided to recognition circuitry 407 where the first individual is identified (preferably using facial recognition techniques). server. If not, the image is provided to recognition circuitry 407 where the first individual is identified (preferably using facial recognition techniques).

At step 505, logic circuitry 403 uses the identification of the first individual to determine if any items have been purchased for the first individual. This is preferably accomplished by accessing storage 405 to determine if any information on purchased items exists. As discussed above, storage 405 may be populated by retailers, or the first individual.

Information on past purchased items (if any) is then provided by logic circuitry 403 to recognition circuitry 407. This information may comprise attributes or properties of the past items purchased (e.g., blue t-shirt, black shoes, . . . , etc.) Based on this information, in step 507, recognition circuitry 407 determines if any purchased items exist within the image. Identification information on such identified items is then provided to logic circuitry 403 to transmitter 401, and ultimately to the second individual ("users" in step 509). More particularly, at least a second individual is provided information on at least one past item purchased by the identified first individual that is worn or used by the identified individual within the image.

As discussed above, the step of providing the second individual the information on the at least one past item purchased may comprise the step of posting the information to social media, or simply transmitting the information to a device used by the second individual. The information comprises information taken from the group consisting of a product manufacturer, a product name, a product price, a retail store offering the product, an internet address where information on the product is available, a SKU, a UPC/ISBN/EAN, a color, a size, a style, a model number, a brand, calories, a weight, a manufacturer, and a direct purchase link.

It is envisioned that in various embodiments other information on the image may be utilized by recognition circuitry 407 in order to determine what information is provided to the requester. For example, a location of the image may be used to determine what information to provide the requester, or the location of the requester may be used to narrow information provided to the requester. For example, if the location of the image is at a golf course, then past purchased items relating to golf may be provided to the requester.

It is also envisioned Individuals may be paid based on sales. For example, it is envisioned that an individual identified within the image may obtain some compensation for any sale resulting from interest within the image. So, for example, an internet address where the past item purchased can be obtained may be provided to the second individual and retailers may track internet sales that resulted from identification information on a particular image. Individuals within the image may be compensated based on "clicks" to the address provided. With this in mind, optional steps 511 and 513 are provided in FIG. 5. At step 511 logic circuitry 411 determines a user navigated to the internet address provided, and compensates the user based on the determination. The compensation may be in the form of adding money to an existing account. Steps 511 and 513 allow the possibility for "alpha users", "trend-setters", and famous individuals to make their profile public for the purposes of shopping list matches, and be compensated accordingly.

In the foregoing specification, specific embodiments have been described. However, one of ordinary skill in the art appreciates that various modifications and changes can be made without departing from the scope of the invention as set forth in the claims below. For example it is envisioned that information on identified individuals within an image may only be to people known to the identified individual (e.g., social media "friends" are the only people able to obtain information on an individual's purchases). Furthermore, information returned to an individual may be based on time as well as location. For example, items purchased 10 years ago may not be relevant today. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing purchase history, the method comprising the steps of:
   receiving an image;
   using recognition circuitry to identify a first individual within the image;
   identifying past items purchased by the identified first individual by accessing a purchase history for the identified first individual;
   using the recognition circuitry to identify items worn or used by the identified first individual; and
   providing to a second individual, information on at least one past item purchased by the identified first individual that is worn or used by the identified first individual within the image based on the purchase history.

2. The method of claim 1, wherein the step of receiving the image comprises the step of receiving the image from the second individual.

3. The method of claim 1, wherein the step of receiving the image comprises the step of retrieving the image from storage.

4. The method of claim 1, wherein the step of identifying the first individual comprises the step of identifying the first individual from information received from the second individual.

5. The method of claim 1, wherein the step of identifying the first individual comprises the step of using facial recognition circuitry to identify the first individual.

6. The method of claim 1, wherein the step of providing the second individual the information on the at least one past item purchased comprises the step of posting the information to social media.

7. The method of claim 1, wherein the step of providing the second individual the information on the at least one past item purchased comprises the step of transmitting the information to a device used by the second individual.

8. The method of claim 1, wherein the information comprises information taken from the group consisting of a product manufacturer, a product name, a product price, a retail store offering the product, an internet address where information on the product is available, a SKU, a UPC/ISBN/EAN, a color, a size, a style, a model number, a brand, calories, a weight, a manufacturer, and a direct purchase link.

9. The method of claim 1, wherein the step of providing the second individual the information on the at least one past item purchased comprises the step of providing the second individual with an internet address where the past item purchased can be obtained.

10. The method of claim 9, further comprising the step of determining if the second user navigated to the internet address, and compensating the first user based on the determination.

11. A server comprising:
   a receiver receiving an image;
   recognition circuitry identifying a first individual within the image and items worn or used by the identified first individual;
   a microprocessor identifying past items purchased by the identified first individual by accessing a purchase history for the identified first individual; and
   a transmitter providing to a second individual, information on at least one past item purchased by the identified first individual that is worn or used by the identified first individual within the image based on the purchase history.

12. The server of claim 11 wherein the image was received from the second individual.

13. The server of claim 11, further comprising: storage, storing the image and the past items purchased.

14. The server of claim 11, wherein the receiver receives identification information from the second individual.

15. The server of claim 11, wherein the recognition circuitry comprises facial recognition circuitry.

* * * * *